Sept. 15, 1959  E. A. MEYER  2,903,939
STUD RETAINER WITH TEETH ARRANGED TO ENGAGE STUD
IN A PLURALITY OF POSITIONS
Filed Oct. 27, 1958  2 Sheets-Sheet 1
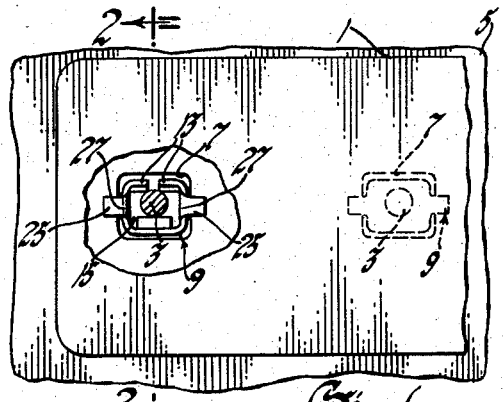
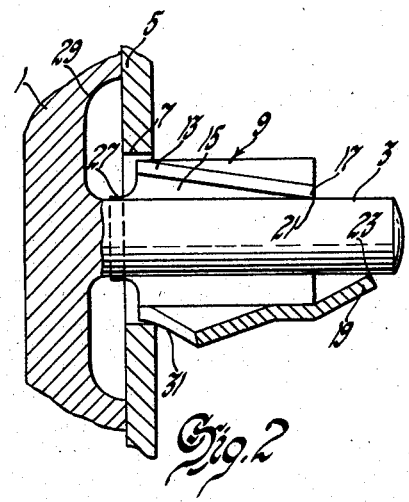
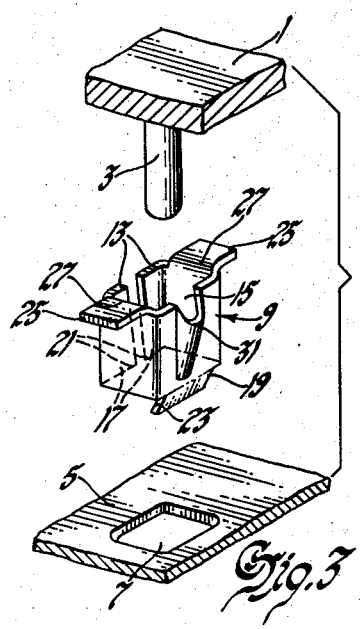
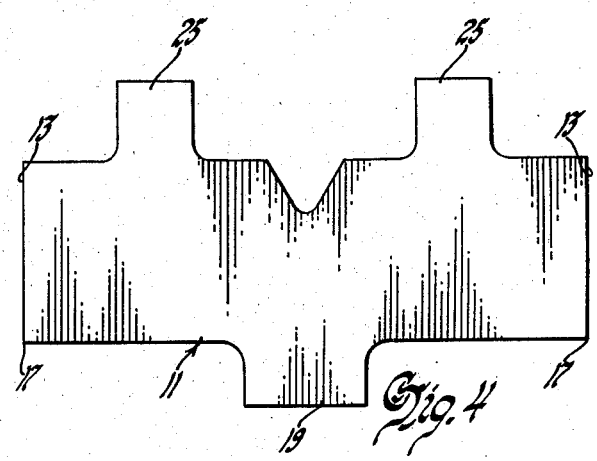
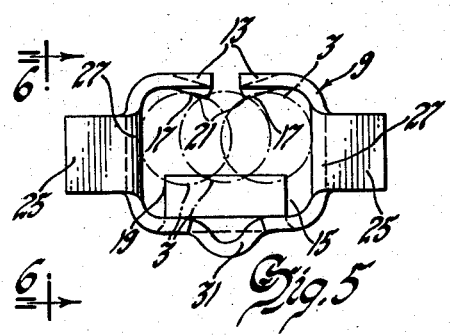
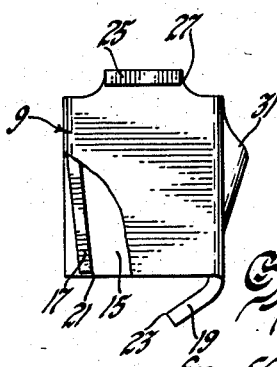
INVENTOR
Engelbert A. Meyer
BY
L. D. Burch
ATTORNEY

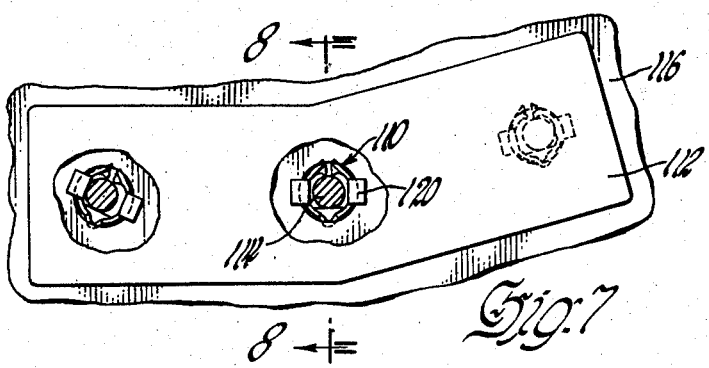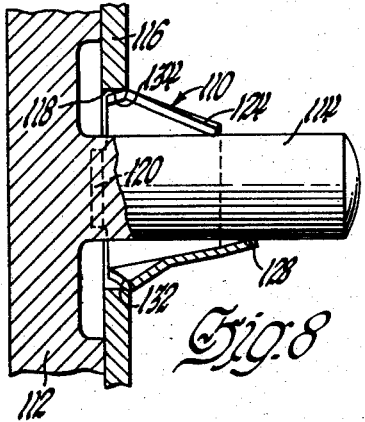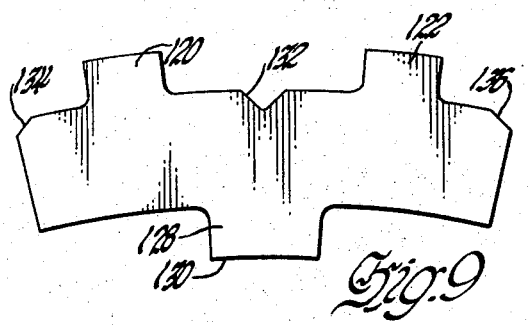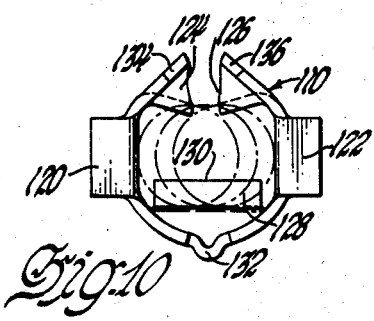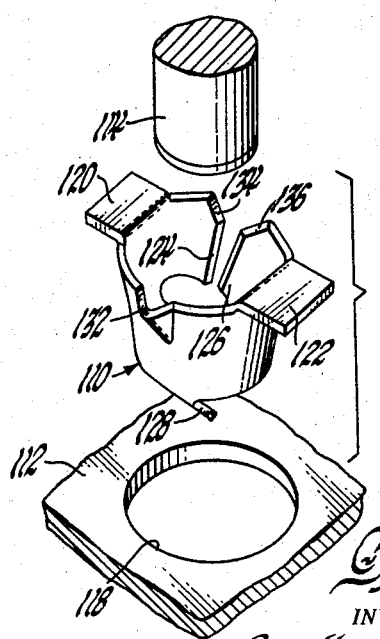
INVENTOR.
Engelbert A. Meyer
BY
ATTORNEY

United States Patent Office 2,903,939
Patented Sept. 15, 1959

2,903,939

STUD RETAINER WITH TEETH ARRANGED TO ENGAGE STUD IN A PLURALITY OF POSITIONS

Engelbert A. Meyer, Detroit, Mich., assignor to General Motors Corporation, Detroit, Mich., a corporation of Delaware Application October 27, 1958, Serial No. 769,767

7 Claims. (Cl. 85—36)

This application is a continuation-in-part of my co-pending applications Serial No. 383,545 filed October 1, 1953, and Serial No. 571,044 filed March 12, 1956, now both abandoned.

The invention relates to fastening devices generally, and more particularly to fastening devices adapted to secure objects provided with studs to supporting members provided with apertures for receiving the studs.

In securing a molding, ornament or the like to a supporting wall or panel of which only one side is accessible, it is common to employ a hollow sheet metal fastening device adapted to be snapped into engagement with an aperture in the panel and to receive a stud associated with the ornament. Where little or no clearance is provided for the fastening device within the aperture or for the stud within the fastening device, considerable difficulty is experienced where the ornament is distorted in the manufacturing process so that the studs do not register with the apertures and the fastening devices engaged therein. In such cases, either the apertures must be relocated, the studs must be forced into the fastening devices, or the ornament must be discarded. The above measures necessitated by distortion increase production costs and result in inferior work.

It is now proposed to provide a fastening device of the type and for the purpose described above which will to a great extent eliminate the above problems due to distortion. This is accomplished by providing clearance for the stud within the fastening device and by providing the fastening device with novel stud engaging means so that the stud may be effectively retained in a number of positions within the fastening device. Distortion may also be compensated for by the judicious arrangement of the apertures in the panel. One modification embodying the invention will provide stud engaging means which not only permit the receipt and retention of a stud member in numerous positions but which is itself retainable within a supporting wall in numerous positions. It is also proposed to provide a fastening device such as that described which will, due to the arrangement and structure of the stud engaging means provided thereon, engage the stud more securely than do fastening devices presently employed.

In the drawings:

Figure 1 is a plan view partly cut away and partly in cross-section of an installation embodying the present invention.

Figure 2 is a cross-sectional view partly in elevation taken along the plane of line 2—2 of Figure 1.

Figure 3 is an exploded perspective view of an installation embodying the present invention.

Figure 4 is a developed view of a sheet metal blank from which a fastening device embodying the present invention may be formed.

Figure 5 is a top plan view of a preferred form of fastening device embodying the present invention.

Figure 6 is a side elevational view taken in the direction 6—6 of Figure 5.

Figure 7 is a fragmentary cut-away section of an assembly making use of a modification of the stud fastening means of Figures 1–6.

Figure 8 is an enlarged cross-sectional view of the fastener means of Figure 7 taken in the plane of line 8—8 and looking in the direction of the arrows.

Figure 9 is a developed view of the fastener means of Figure 7.

Figure 10 is a top plan view of the fastener means of Figure 7.

Figure 11 is a side elevational view of the fastener means of Figure 7 having one retainer lip thereof broken away.

Figure 12 is an exploded perspective view of an assembly making use of the fastener means of Figure 7.

Referring to Figures 1 through 6 of the drawings in more detail, a molding, ornament or the like 1 having studs 3 formed therefrom is secured by means of a fastening device 9 to a supporting wall or panel 5 having apertures 7 formed therein in substantial alignment with the studs 3.

A fastening device of preferred form may be constructed from a sheet metal blank 11 such as that shown in Figure 4. It will be noted that blank 11 is bent so that ends 13 are adjacent and oppositely disposed to provide an expansible body having a stud receiving passage 15 the internal dimensions of which substantially exceed the cross-sectional dimensions of studs 3. Corners 17 of ends 13 and the longer tab 19 are bent obliquely into the stud-receiving passage 15 to form members 17 and 19 having stud-engaging edges 21 and 23. Tabs 25 are bent outwardly to form shoulders 27 for engaging the accessible side of the panel 5. Ornament 1 may be recessed as at 29 to receive shoulders 27 so that ornament 1 may rest flush against panel 5 without obstruction from shoulders 27. Shoulder 31 is formed on one side of fastener 9 to engage the inaccessible side of panel 5.

In securing ornament 1 to panel 5, a fastener 9 is inserted through each of the apertures 7 and snapped into engagement with panel 5 by shoulders 27 and 31. Ornament 1 is positioned so that studs 3 are in alignment with stud receiving passages 15 and the studs 3 are pushed through passages 15 until ornament 1 rests flush against panel 5.

It will be observed that member 19 is less resilient than member 17 so that as stud 3 passes through stud-receiving passage 15 edge 23 urges the stud against edges 21 and at the same time edge 23 urges shoulder 31 into engagement with the inaccessible side of panel 5. Furthermore, since edge 23 is offset from edges 21 with respect to the axis of stud 3, edge 23 would tend to tilt stud 3, if it were free, into engagement with edges 21. However, since the stud is attached at one end to an ornament 1 which is normally wider than fastener 9, the fastener rather than the stud tends to be slightly tilted. This tilting action enables edges 21 and 23 to more securely engage the stud than would be otherwise possible because edges 21 and 23 tend to assume a position more normal to the axis of the stud.

Since the internal dimensions of passage 15 in the direction between shoulders 27 is substantially greater than the cross-sectional dimensions of stud 3, distortion in any direction along the line between shoulders 27 may be compensated for by displacement of ornament 1 in an equal and opposite direction. Where stud 3 is exactly centered in passage 15 three-point contact occurs between edges 21 and 23 and stud 3. In any other position of stud 3 within passage 15, two-point contact occurs, member 19 being a common contact point in any case. Likewise, since the internal dimensions of passage 15 in the direction between edges 21 and 23 exceeds the cross-sectional dimensions of stud 3 and since members 17 are more resilient than member 19 so that fastener 9 tends to be tilted as above described, limited distortion in the direction between edges 21 and 23 may be compensated for. In addition, limited compensation for distortion in all directions in the plane of the panel 5 may be attained by judiciously arranging the apertures 7 so that the greater compensation available in the direction of a line between shoulders 27 may be utilized for that purpose.

The modified stud fastener means of Figures 7 through 12 is formed from a sheet metal stamping such as is shown in Figure 9. The fastener means is formed substantially circular in cross-section, as is shown in the other figures, to provide an elongated open cylindrical body member 10. As used to retain a member 12, having studs 14 provided thereon, to a supporting member 16, having apertures 18 formed therein, the body member 10 is received within one of the apertures 18 of the supporting member and receives and retains one of the studs 14 therein.

The sheet metal body member 10 has flanges or ears 20 and 22 formed from one end thereof which extend beyond the apertures 18 to engage the supporting member 16 within which it is received. The body member is tapered towards the other end, as shown, to be more readily receivable within the apertures of the supporting member and has the lower corners 24 and 26 of the spaced edges of the open cylindrical body member bent inwardly. A flange 28 is formed from the tapered edge of the body member 10, opposite the inbent corners 24 and 26, and has a straight edge 30 extending across the opening through the body member.

A shoulder 32 is formed from the flanged end of the body member 10, which, with shoulders 34 and 36 formed from the upper corners of the spaced edges of the open cylindrical body member, engages the inaccessible underside of the supporting member 16 when a stud 14 is received within the body member to spread the shoulders into engagement therewith, as shown by Figure 8.

Referring to Figure 10, it will be seen that the passageway through the body member 10 is larger than the stud 14 received therein and that the flange 28 and inbent corners 24 and 26 as displaced to receive a stud therein will engage and retain the stud in numerous different positions between the sides of the body member. As shown in Figure 12, it is preferable that the apertures 18 formed within the supporting member 16 be circular in cross-section as is the stud fastener member 10, to enable the fastener member to be rotated through 360° to receive a stud at any position within the limits of the apertures 18, as is shown best in Figure 7.

What is claimed is:

1. A sheet metal fastening device for securing an object having spaced studs to a support having spaced apertures in substantial alignment with said studs, comprising a hollow sheet metal body of elongated symmetrical cross-section and including a shoulder whereby said body is snapped into engagement with one of said apertures and receives and retains one of said studs in either of a plurality of lateral positions, said body having one internal cross-sectional dimension substantially exceeding the cross-sectional dimensions of said one stud and said body having a pair of separate obliquely disposed and inwardly bent point engageable stud biting portions intermediately spaced along one of the sides thereof having the greater dimension and a single wider obliquely disposed and inwardly bent edge engageable stud biting portion along the opposite side thereof, said obliquely disposed biting portion being spaced longitudinally of said body from said pair of biting portions, said inbent portions providing a three-point biting contact with said stud when said stud is in normal centered position within said body and a two-point biting contact when due to misalignment between said studs and said apertures said stud is not in normal centered position within said body.

2. A sheet metal fastening device for securing an object having spaced studs to a support having spaced apertures in substantial alignment with said studs, comprising a hollow sheet metal body of elongated symmetrical and angularly defined cross-section and including a shoulder whereby said body is snapped into engagement with one of said apertures and receives one of said studs, said body having at least one cross-sectional dimension substantially exceeding any of the cross-sectional dimensions of said stud and a second cross-sectional dimension of said body and said body having separate obliquely disposed and inwardly bent pointed tabs along one of the sides thereof having the greater dimension and a single longer obliquely disposed and inwardly bent edge tab along the opposite side thereof, said tabs providing a three-point biting contact with said stud when said stud is in normal centered position within said body and a two-point biting contact when said stud is not in normal centered position within said body.

3. A fastening device for securing an object having at least two spaced studs to a support having at least two spaced apertures in substantial alignment with said studs, comprising a hollow sheet metal body of elongated symmetrical cross-section defined by a plurality of generally flat surfaces and including a shoulder whereby said body is snapped into engagement with one of said apertures and receives one of said studs, said body having both internal cross-sectional dimensions substantially exceeding the cross-sectional dimensions of said stud and said body having at least two separate obliquely disposed and inwardly bent members of predetermined resiliency along one side thereof having the greater dimension and a single wider obliquely disposed and inwardly bent member having a predetermined resiliency less than said first named members and positioned along the opposite side thereof, said members providing at least a two-point biting contact between one of said separate members and said single wider member and said stud in any position of said stud within said body along said greater dimension.

4. A resilient fastening device for securing an object having spaced studs to a support having spaced apertures in substantial alignment with said studs, comprising a hollow sheet metal body of rectangular cross-section and including a shoulder whereby said body is snapped into engagement with one of said apertures and to receive one of said studs, said body being longitudinally split on one side thereof and said body having a pair of separate obliquely disposed and inwardly bent pointed tabs formed from the corners of said body adjacent said split and a single wider obliquely disposed and inwardly bent tab extending across the opposite side thereof and parallel thereto, said first named tabs having stud engaging points and said second named tab having a stud engaging edge spaced axially of said stud from said points.

5. A sheet metal fastening device for securing an object having spaced studs to a support having spaced apertures in substantial alignment with said studs, comprising a tubular sheet metal body of laterally elongated rectangular cross-section and including a shoulder whereby said body is snapped into engagement with one of said apertures and to receive one of said studs, said body having at least one internal cross-sectional dimension substantially exceeding any cross-sectional dimension of said stud and said body having at least two separate obliquely disposed and inwardly bent stud-engaging portions along one side thereof having the greater dimension and a single wider obliquely disposed and inwardly bent stud-engaging edge portion along the opposite side thereof, said portions presenting at least a one point and one edge contact between one of said spaced portions and said single wider portion to said stud on opposite sides of said stud in any lateral position of said stud within said body along said greater dimension.

6. A fastening device secured to a mount having an aperture for receiving said device, said device receiving and holding a stud in any of a plurality of lateral positions, said device comprising a body having a generally rectangular cross-section defined by a first pair of sides and a second pair of sides substantially longer than said first pair of sides, said first pair of sides having oppositely extending outwardly bent tabs adjacent one end of said body, one of said second pair of sides having a longitudinal aperture extending the length of said body, said one side further having inwardly bent stud engaging members formed only at the edges of said aperture adjacent the end of said body opposite said tabs, the other of said second pair of sides having an angularly disposed and offset center portion extending longitudinally and outwardly toward the end of said body having said tabs, and an inwardly bent integrally formed stud engaging member extending transversely across the other end of said other side, said last named inwardly bent member having a stud engaging edge laterally opposite and axially spaced from said first named inwardly bent members, said tabs and said offset center portion engaging said mount on opposite sides to secure said fastening device to said mount within said mount aperture.

7. A sheet metal fastening device for securing a member having spaced studs provided thereon to a base member having spaced apertures formed therein receiving one of said fastening devices in at least one of said apertures, said fastening device comprising an axially extending generally tubular body received within one of said base member apertures, said body having a slit longitudinally extending the length of said body, one end of said slit having inwardly bent corners defining pointed stud biting contacts, said body further having a pair of oppositely disposed tabs radially extending therefrom at one end and an angularly offset and outwardly extending portion intermediate said tabs and diametrically opposite said slit, said portion having a beveled edge, said beveled edge cooperating with said tabs to retain said fastening device in said base member aperture, said body further having an inwardly bent flange having a stud engaging edge diametrically opposite said one slit end and spaced therefrom, said pointed stud biting contacts and said flange edge cooperating to define stud retaining points, said fastening device retaining a stud inserted therein when said stud is in contact with said flange edge and at least one of said points, said body permitting substantial stud positioning and retaining latitude along a diameter connecting said tabs.

No references cited.